Figure 1:
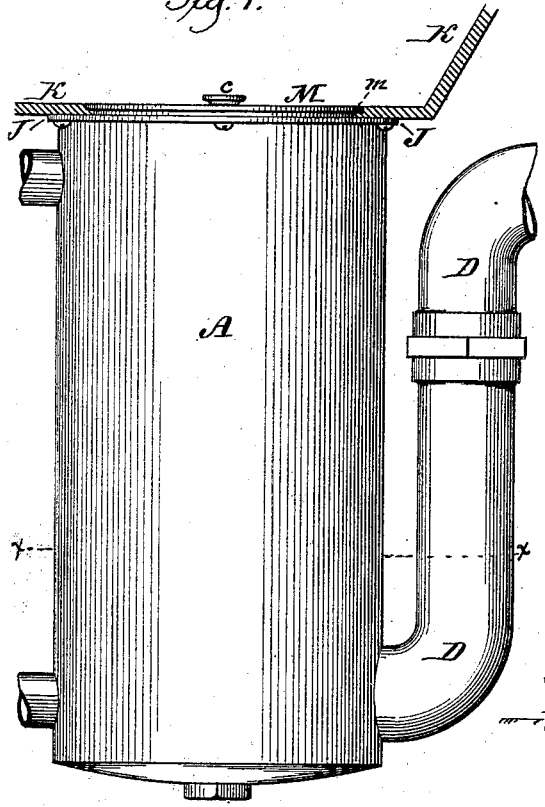

(No Model.)

J. TUCKER.
GREASE TRAP FOR SINKS.

No. 285,770. Patented Sept. 25, 1883.

Attest;
M. H. Smith
H. C. Jarvis

Inventor
John Tucker
By
J. N. McPeture
Att'y.

N. PETERS, Photo-Lithographer, Washington, D. C.

UNITED STATES PATENT OFFICE.

JOHN TUCKER, OF NEW YORK, N. Y.

GREASE-TRAP FOR SINKS.

SPECIFICATION forming part of Letters Patent No. 285,770, dated September 25, 1883.

Application filed February 24, 1883. (No model.)

*To all whom it may concern:*

Be it known that I, JOHN TUCKER, of New York, in the county of New York and State of New York, have invented certain new and useful Improvements in Grease-Traps for Sinks; and I do hereby declare that the following is a full, clear, and exact description thereof, reference being had to the accompanying drawings, making part of this application.

My invention relates to a novel contrivance or apparatus designed to be applied to the waste-pipes of sinks or other receptacles into which greasy water or other liquid grease may be emptied, and has for its purpose to arrest and effect the accumulation of all grease which may be in the liquid which has to pass through the apparatus, and thus prevent any choking up or incrusting of the interior walls of the waste-pipe (or of its siphon-like connection with the sink) with congealed grease.

As is well known to plumbers and those familiar with the use of sinks and other receptacles or vessels provided with waste-pipes leading to sewer-connections, from the dumping of greasy liquids into such sinks or other receptacles, and from the discharge of such liquids through the ordinary siphon-like connection and the waste-pipe leading to the sewer-connection, serious inconvenience is often occasioned by the congelation and accumulation of the grease on the interior walls of the ordinary trap-like connections and waste-pipes leading from the sink or other receptacle. It is not an uncommon thing for the ordinary waste-pipes through which greasy waters have to pass to become, eventually, entirely clogged or choked up, so that they have to be cut open and cleaned out, which latter operation not only causes considerable trouble and expense, but great inconvenience and annoyance to the householder. Furthermore, the known liability of waste-pipes leading from sinks or other receptacles to become choked up renders it impracticable to have such waste-pipes inclosed within the walls or other permanent portions of the house, in which it would be convenient and desirable to place such pipes but for the necessity of having them exposed in order to clean them out in case of their becoming clogged by the accumulation therein of grease.

I propose by my invention to overcome all the difficulties and objections which have heretofore existed in the known system of plumbing sinks and other receptacles into which greasy liquids are emptied by the employment of a grease-trap or grease-collecting contrivance adapted to be connected with the discharge-orifice of the sink or other receptacle, and located intermediate of it and the waste-pipe leading to the sewer-connection, and which is so constructed and operates in such a manner that while the watery portion of greasy liquids discharged from the sink will freely pass through said grease-trap and into the waste-pipe, all grease (contained in any such discharged liquids) will accumulate within a chamber of the contrivance, from which it may now and then be easily removed, all as will be hereinafter more fully described.

To enable those skilled in the art to which my invention relates to perfectly understand and practice the same, I will now proceed to more fully describe the construction and operation of the contrivance embracing my invention carried out in the form in which I have so far successfully practiced it, and which is the best form now known to me, referring by letters of reference to the accompanying drawings, which make part of this specification, and in which—

Figure 2:
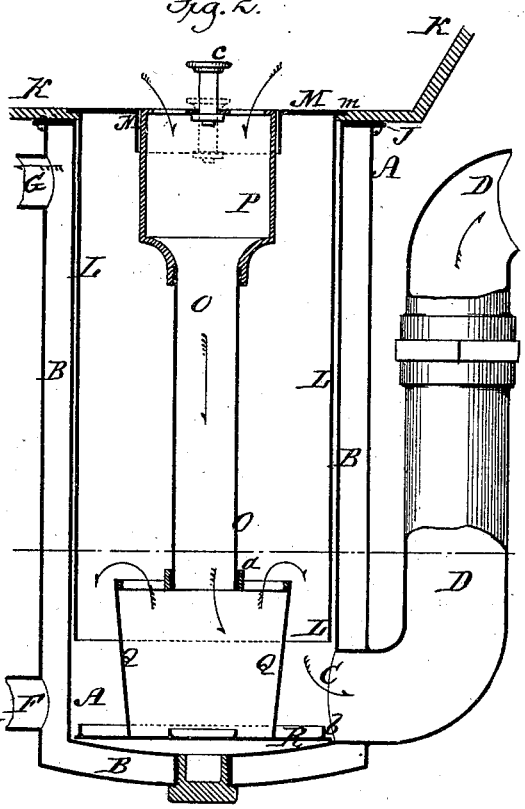
Figure 4:
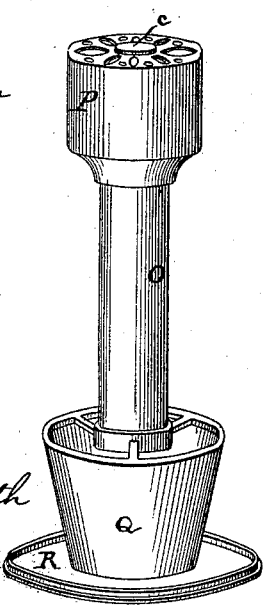
Figure 3:
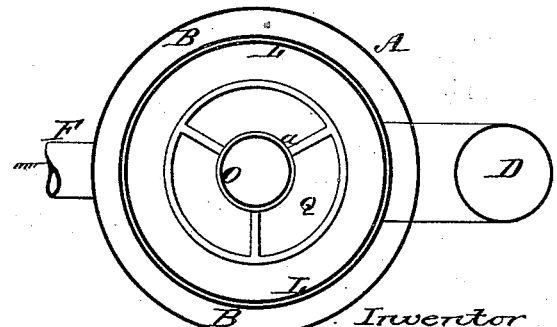

Figure 1 is a side elevation of my novel grease-trap represented as applied to an ordinary kitchen-sink and the waste-pipe thereof. Fig. 2 is a vertical longitudinal section of the same; Fig. 3, a horizontal section at the line *x x* of Fig. 1, and Fig. 4 a perspective view of the removable strainer and discharge-pipe detached from the rest of the apparatus.

In the several figures the same parts will be found designated by the same letters of reference.

A represents a cylindrically-shaped receiver or vessel, closed at the bottom, open at the top, and formed with double walls, so as to have a surrounding water space or jacket, B, as clearly illustrated. The said vessel or receiver has a discharge-orifice, C, at one side, near the bottom, to communicate with the ascending or siphon-like pipe D, which in turn communicates at its upper end with the usual waste-pipe. The said vessel or receptacle is also provided with ingress and egress nozzles F and G, which are provided with connections for the purpose of affording a supply of cold water, which passes in through one of said connections and out through the other, as indicated by the arrows at Fig. 2, for the desired purpose of keeping up a circulation in the water-jacket, and thus keeping cool the interior of the vessel or receptacle A, and said receptacle is also formed or provided at its upper end with flange-like lugs or projections J, by means of which it is securely bolted to the under side of the sink K, in such manner (as clearly shown) that the center or axis of said cylindrical receptacle shall be about coincident with the center of the discharge-orifice in the bottom of the sink.

L is a cylindrical tube, which is adapted to fit loosely within the vessel A, and which is provided at its upper end with a centrally-open head, M, the periphery of which projects slightly beyond the circumference of said tube, so as to form a circumferential flange-like device, as seen at $m$, which is adapted to rest upon and fit within a recessed or rabbeted portion of the circular discharge hole or orifice of the sink. This cylindrical tube, it will be observed, is somewhat shorter than the length of the interior space of the cylindrical vessel A, so that the lower end of said tube, when the latter is in place, does not pass below the upper part of the discharge-orifice C, leading from the interior of the vessel A to the ascending pipe, which is connected to the waste-pipe.

O is a vertical pipe or tube, the upper end of which is formed or provided with a slightly-enlarged chamber, P, the exterior of which fits and works vertically within the central circular opening of the head M of tube L, and the upper end of which is perforated, after the fashion of the usual strainer used in the discharge-openings of sinks and other vessels, (to prevent the passage of any solid or bulky matter which might choke or clog up the pipes leading from the sink.) This tube O is connected at its lower end with the central eye or hub-like device, $a$, of the dish or cup Q, at the bottom of which latter is arranged the circular plate or disk R, which is adapted to fit loosely within the receptacle or vessel A, and which, when all the parts of the apparatus are in working position, rests upon the bottom of said vessel.

It will be seen by reference to Fig. 2 (in which all the parts of that contrivance are represented in their normal positions) that a free means of escape of water or other liquid from the sink to the waste-pipe is afforded through the medium of the descending pipe or tube O, thence into the cup Q, from which, as the latter overflows, said liquid is free to ascend outside of the pipe O, thus filling the spaces between said pipe O and the interior of tube L, and between the exterior of said tube L and the interior wall of the vessel A, and also filling up (to the level at which the liquid is free to pass into the waste-pipe) the ascending pipe D, which connects said waste-pipe with the exit-orifice C of the vessel A.

The circular plate or disk R is formed, as shown, with a sort of annular flange, leaving a recess at $b$, and this recessed flanged periphery of said plate or disk is adapted to fit to the lower end of the tube L, so that in the event of said plate or disk being lifted up to the level of the lower open end of said tube the latter will be effectually closed up by said disk, and the perforated or strainer-like upper end of the enlarged portion or chamber P of the tube O is provided with a centrally-arranged stud having a button-shaped handle or knob-like device, $c$, at its upper end, to be used whenever it shall be necessary to lift up said strainer device, together with its attached tube O and circular plate or disk R, in operating the contrivance for the purpose of removing from the vessel A any undue quantity of solid matter which may have accumulated therein. The operation of the apparatus for the purpose of such removal will be further explained in the course of the following description of the general operation of the contrivance.

With all the parts relatively arranged as shown at Fig. 2, any liquid contents of the sink K which may contain grease or other matters subject to congelation, and which it is not desirable should be discharged into the waste-pipe, will freely pass or flow down through the strainer-like device P, and, passing thence downward through the pipe O, will ascend around the outside of said pipe, and, filling the space between the exterior of said pipe O and the interior of tube L, and also the space between the exterior of said tube L and the interior wall of the vessel A, and filling, also, the ascending pipe D, (which communicates with the lower end of the vessel A,) will pass off through the waste-pipe.

Now, as any greasy or other matter the specific gravity of which is less than that of water will naturally tend to float or stay uppermost, it follows that the tendency of such matter will be to remain in the upper end or portion of the receptacle A, and the result of such tendency will be the accumulation of such matters on the top or upper surface of the mass or bulk of water which is supposed to always remain in said receptacle, and also in the ascending discharge-pipe D up to the level at which the water can run off into the waste-pipe. As such greasy substance or matter exists only under conditions of the water or fluid in which it is contained such as will keep it in a partially heated and melted (or semi-fluid) condition, it follows that any means for chilling or lowering the temperature of the vessel A will operate to facilitate or expedite the congelation of all such matter that may be discharged in the said vessel, (along with the water in which said matter is held in suspension, or with which it is in mechanical admixture.) To obtain this object the vessel A is provided with the water-jacket shown, and means for keeping such jacket supplied with cold water, which is kept cool by the circulative operation induced by the ingress and egress water-pipes, connected, respectively, at points near the bottom and near the top of said water space or jacket, in a manner well understood by those familiar with plumbing, and with contrivances for inducing and keeping up the circulation of water in a water space or vessel to which any degree of heat may happen to be in any manner applied.

It will be understood that as the accumulating mass of congealed or partially-solidified greasy matter collected on the top of the mass of water standing in the vessel A is supplied always from beneath, said accumulation, as it increases, will extend downward, and, if permitted to increase sufficiently, will eventually operate to wholly or partially clog up the free passage of the waste water upwardly from the overflow-cup Q, and that from the failure of the waste water to pass off fast enough from the sink, the servant or attendant will understand that the receptacle A needs cleaning. This clearance of the receptacle, or the complete removal of all the congealed or partially-solidified greasy matter which may have accumulated therein, is effected in the following manner: By taking hold of the knob-like device or handle c, the tube O, with its attached cup Q and circular bottom plate or disk, R, is lifted bodily upward until the flanged and recessed periphery b (hereinbefore referred to) of the disk R comes up against and fits itself to the open lower end of the tube L, and then a continuance of the lifting or pulling upwardly will effect the complete removal from the vessel A of the tube L and the other removable parts, together with the mass of greasy matter contained within said tube, from which latter and the other removable devices all such greasy material may be subsequently removed by the separation of said tube from the parts seen detached at Fig. 4 of the drawings. After having been cleaned the removable parts may be replaced by simply placing the tube L down over the device seen at Fig. 4 until it shall rest at its open lower end on the disk R, and then by taking hold of the handle c and inserting the devices again within the vessel A, in doing which, of course, the tube L will first come to its proper position or resting-place when its flange comes to be seated in the recessed circular opening at the bottom of the sink, after which the interior devices (shown detached at Fig. 4) will come to the proper position by descending farther, until the disk R rests upon the bottom of the vessel A, all as shown at Fig. 2.

It will be seen that in a contrivance such as herein shown and described the passage of floating greasy substances downwardly, and thence upwardly into the waste-pipe, is effectually prevented, and that, therefore, all clogging, and the consequent evils of an accumulation of grease in the interior of the waste-pipe and its connections, are entirely obviated, while at the same time (especially in establishments where considerable greasy matter may be saved from the waste liquids) means are afforded for the collection and removal from the contrivance shown of waste matter which may be utilized with more or less profit to the householder and user of the apparatus shown.

Of course, the sizes and proportions of the parts are not material to my invention, so long as they are such as to insure the proper operation of the apparatus shown, and various changes and modifications may be made in the details of construction without departing from the spirit of my invention, the leading feature of which, it will be observed, rests in the idea of discharging water from the receptacle, to be emptied into the lower portion of a vessel within which greasy matters may float up to the upper portion, thus avoiding their passage into the discharge-pipe, which ascends from the lower end of said vessel.

It is of course desirable and important that there should always be means for assisting or facilitating the chilling of the greasy matter, which is thus enabled to float up and accumulate in the upper portion of said vessel; but I do not wish to be understood as restricting my claims of invention either to any precise details of construction or to the presence in the contrivance shown and described of all the characteristic features pointed out, because the details of construction may be varied without materially changing the principle of operation of the apparatus; and some one of the described characteristic features may possibly be omitted without losing the main effects and advantages of my invention.

Having so fully described my novel contrivance for the arrest and removal of the greasy matters discharged from sinks and other analogous receptacles that those skilled in the art may make and use contrivances wholly or partially involving my improvements, what I claim as new, and desire to secure by Letters Patent, is—

1. A grease-trap, or contrivance for preventing the flow of greasy matters into the waste-pipe, composed of a chamber or receptacle which is adapted to be applied to the orifice of a sink, and which is provided with an ascending discharge pipe or leg, D, and also with means, substantially such as described, for conveying the liquid discharged into said receptacle down to the vicinity of its lower end, whereby the particles of greasy matter which may be contained in said liquid are carried down to the lower end of said receptacle, and are permitted to float upwardly therefrom and accumulate near the surface of the mass of liquid contained in said receptacle and around the tube through which liquid is conveyed into said receptacle, substantially as hereinbefore described.

2. The combination, with a receptacle adapted to receive the greasy liquids from the sink, and a suitable discharge or exit pipe leading upwardly from the bottom of said receptacle, of means for affording a supply of cold water (or other chilling medium) for keeping said receptacle cool, for the purpose of facilitating the congelation of the greasy matters, substantially as set forth.

3. The combination, with the receptacle A, of a tubular device, L, and a central tube, O, which is connected at its upper end with the chamber P, and adapted to receive the contents of the sink, and is provided at its lower end with a circular plate or disk, R, the combination being such, as described, that upon the removal upwardly of said tube O, with its bottom plate or disk, R, the lower end of the tubular device L will first be closed up, and then all of the removable parts will be lifted out of the vessel A, for the purpose of removing from the latter the mass of collected grease, as hereinbefore set forth.

4. The combination, with the receptacle A and the tube O, of the cup-like device or dish Q, into which the lower end of said tube O discharges, and from which the discharged liquid overflows, substantially as hereinbefore set forth.

In testimony whereof I have hereunto set my hand and seal this 23d day of February, 1883.

JOHN TUCKER. [L. S.]

In presence of—
M. H. SMITH,
H. C. JANVIER.